United States Patent Office.

RUDOLPH D'HEUREUSE, OF NEW YORK, N. Y.

Letters Patent No. 112,226, dated February 28, 1871.

IMPROVEMENT IN THE FERMENTATION AND PURIFICATION OF ORGANIC SUBSTANCES.

The Schedule referred to in these Letters Patent and making part of the same.

I, RUDOLPH D'HEUREUSE, of the city, county, and State of New York, have invented an "Improvement in the Fermentation, Purification, Preserving, and Curing of Organic Substances," of which the following is a specification.

The nature of my improvement consists in performing the operations under a higher than the common atmospheric pressure.

Currents of atmospheric air or other gases, impelled through organic substances that are subjected to a fermentation, purification, or curing are of incalculable benefit in these processes, in which an elimination of the albuminous parts, their coagulation, or an alteration of the nitrogenous deleterious matter is required, and patents for improvements in such processes are secured by me August 6, 1867 and August 3, 1869.

In open vessels or receptacles, or under ordinary atmospheric pressure, the action is sometimes slow, so that the currents of air or gases have to be continued for a long time, the temperature to be unduly raised, &c., or the action on some substances is altogether indifferent.

The requisite chemical action is out of proportion intensified by conducting under a higher pressure the process of fermentation or germination, the purification, preserving, or improving of organic substances, by currents of air or other gases, intended to act principally upon the nitrogenous parts of said organic substances.

This increased intensity in the chemical action secures advantages in time, labor, superiority of product, &c. For instance, impure liquids of high saccharine density, and other fluids that resist the action of currents of air under ordinary atmospheric pressure, are readily acted upon and purified under increased pressure.

The kinds of gases, varying with the purpose in view, are principally oxygen, ozone, carbonic, sulphurous, and phosphorous acids, and employed generally, though not always, in connection with atmospheric air.

The air or gases of a proper temperature and moisture are impelled into the receptacle of the substance under treatment by suitable pumps, or other blowing apparatus, or by the pressure produced in the generation of the gases from other combinations.

Unless generated in the same room with the substance under treatment itself, the gases or air enter the same, if this is in a fluid state or immersed in a fluid conveniently near the bottom of the vessel or receptacle, by pipes, open or perforated, or by mouth-pieces or perforated plates.

Currents of finely-divided air or gases are generally of more chemical efficiency on organic substances than the same or a larger amount passing through in bulk.

The pressure is controlled by regulating the exit of the air or gases from the receptacle, or in any other manner.

A uniform pressure may be maintained, or the intensity changed at various stages of the process, or the pressure only applied at intervals, and the kind or proportion of the gases employed may be also changed at various times, in which manner effects can be produced not attainable by continuous actions of currents of the same gases.

I do not claim the use of gases under pressure for the mere purpose of impregnating fluids or solids with them, as is done in the manufacture of mineral waters, for sponging bread dough, and the like, or to form a combination of mineral substances by such agents; but

What I claim, and desire to secure by Letters Patent, is—

The mode, to assist a fermentation or germination, the purification of organic fluids from nitrogenous or deleterious matter; the preservation, curing, or improving of organic substances by artificial currents of air or other gases through said substances, in close receptacles, and at a higher than the common atmospheric pressure, substantially as and for the purposes hereinbefore described and set forth.

R. D'HEUREUSE.

Witnesses:
   CARL I. GÜNTHER,
   G. VOGT.